United States Patent
Hajduczenia

(10) Patent No.: US 11,012,410 B2
(45) Date of Patent: May 18, 2021

(54) DISTRIBUTED DENIAL-OF-SERVICE PREVENTION USING FLOATING INTERNET PROTOCOL GATEWAY

(71) Applicant: Charter Communications Operating, LLC, St. Louis, MO (US)

(72) Inventor: Marek Hajduczenia, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 290 days.

(21) Appl. No.: 15/919,942

(22) Filed: Mar. 13, 2018

(65) Prior Publication Data
US 2019/0288984 A1 Sep. 19, 2019

(51) Int. Cl.
*H04L 29/06* (2006.01)
*H04L 29/08* (2006.01)
*H04L 29/12* (2006.01)

(52) U.S. Cl.
CPC ...... *H04L 63/0218* (2013.01); *H04L 61/2007* (2013.01); *H04L 63/1416* (2013.01); *H04L 63/1458* (2013.01); *H04L 67/1002* (2013.01); *H04L 67/1095* (2013.01); *H04L 63/0272* (2013.01); *H04L 63/164* (2013.01); *H04L 63/166* (2013.01)

(58) Field of Classification Search
CPC ........................ H04L 63/1458; H04L 63/0218
See application file for complete search history.

(56) References Cited

U.S. PATENT DOCUMENTS

| | | | | |
|---|---|---|---|---|
| 7,941,556 B2* | 5/2011 | Canali | ..................... | H04L 29/06 370/351 |
| 9,369,302 B1* | 6/2016 | Dickinson | ........... | H04L 41/0896 |
| 2001/0052016 A1* | 12/2001 | Skene | ..................... | G06F 9/505 709/226 |
| 2014/0310418 A1* | 10/2014 | Sorenson, III | ...... | H04L 67/1038 709/226 |
| 2015/0341428 A1* | 11/2015 | Chauhan | ................. | H04L 69/16 709/203 |
| 2016/0036837 A1* | 2/2016 | Jain | ..................... | H04L 63/1416 726/23 |
| 2016/0156648 A1* | 6/2016 | Zisapel | ............... | H04L 63/1441 726/23 |
| 2017/0237767 A1* | 8/2017 | George | ............... | H04L 63/1458 726/23 |
| 2018/0034769 A1* | 2/2018 | Modi | ..................... | H04L 45/122 |
| 2018/0309682 A1* | 10/2018 | Larumbe | ............... | H04L 47/127 |
| 2019/0097973 A1* | 3/2019 | Adler | ................... | H04L 63/0236 |

* cited by examiner

*Primary Examiner* — Jason Chiang
(74) *Attorney, Agent, or Firm* — Otterstedt, Wallace & Kammer, LLP

(57) ABSTRACT

An apparatus for preventing data traffic overload of a customer enterprise network in a networked computing system includes a plurality of data centers, each of the data centers being in operative communication with one another via a secure connection. The data centers form at least one floating gateway for providing a distributed interface between a public network and an Internet Protocol (IP) interface of the customer enterprise network, the IP interface of the customer enterprise network being inaccessible using a public IP address. The apparatus further includes at least one controller in operative communication with the data centers. The controller is configured to synchronize state information among the data centers and to control ingress and egress data traffic for each of the data centers.

22 Claims, 6 Drawing Sheets

DISTRIBUTED DENIAL-OF-SERVICE PREVENTION USING FLOATING INTERNET PROTOCOL GATEWAY

FIELD OF THE INVENTION

The present invention relates generally to the electrical, electronic and computer arts, and, more particularly, to distributed denial-of-service (DDoS) prevention in a networked computing environment.

BACKGROUND OF THE INVENTION

There are many circumstances in which a high volume of data traffic can overwhelm a customer resource in a networked computing system. For instance, in the context of computing, a denial-of-service (DoS) attack is an attempt to make a machine or network resource unavailable to its intended users. Similarly, a distributed denial-of-service (DDoS) attack is an attack in which multiple compromised computer systems attack a target resource, such as a server, router, firewall, website, or other network resource, and cause a denial of service for users of the targeted resource. A flood of incoming messages, connection requests, malformed data packets and the like creates a stream of spurious traffic which, when transmitted to the target system, forces it to slow down or even crash and shut down. Since a server or other network resource can only process a limited number of requests at any given time, if an attacker overloads the target resource with requests, it can't process the requests of its legitimate users, thereby resulting in a "denial of service" because the users are prevented from accessing that resource.

Two common types of DDoS attacks are bandwidth attacks and application attacks. Bandwidth attacks are DDoS attacks which consume resources such as network bandwidth or equipment by overwhelming one or the other (or both) with a high volume of packets. Targeted routers, servers and firewalls, all of which have limited processing capability, can be rendered unavailable to process valid transactions, and can fail under the load. One common form of bandwidth attack is a packet-flooding attack, in which a large number of seemingly legitimate Transmission Control Protocol (TCP), User Datagram Protocol (UDP), Internet Control Message Protocol (ICMP) and/or other protocol IP packets are directed to a target destination, thus filling up the available bandwidth to the target and preventing valid connections from being established. To make detection even more difficult, such attacks might also spoof the source address; that is, misrepresent the Internet Protocol (IP) source address that supposedly generated the request to prevent identification. Application attacks, on the other hand, are DDoS attacks that use the expected behavior of protocols, such as, for example, TCP and Hypertext Transfer Protocol (HTTP), to an attacker's advantage by tying up computational resources and preventing them from processing transactions or requests. HTTP half-open and HTTP error attacks are common examples of application attacks.

Since DDoS attacks are by definition distributed, it can be very difficult to prevent attack traffic when the attacking source IP addresses are so widespread. Furthermore, a growing trend among DDoS attackers is to use sophisticated spoofing techniques and essential protocols (rather than nonessential protocols that can be blocked) to make DDoS attacks even more stealthy and disruptive. These attacks, which use legitimate application protocols and services, are very difficult to prevent; employing broad packet-filtering or rate-limiting measures simply completes the attacker's desired objective by shutting down the system, causing denial of service to legitimate users.

SUMMARY OF THE INVENTION

The present invention, in one or more embodiments, comprises a method and apparatus for preventing a customer enterprise network from being overloaded with data traffic, such as traffic attributable to a distributed denial-of-service (DDoS) attack. One or more aspects of the invention, according to illustrative embodiments thereof, limit exposure of a public IP interface of the customer enterprise network by delegating an IP address from a single location associated with the public interface of the customer enterprise network, essentially pushing the customer IP address into the cloud and providing customers with a floating IP gateway for all of their data services and IP traffic, with hosting implemented using a mesh of distributed data centers. In this manner, aspects of the present invention beneficially prevent or at least significantly reduce the likelihood of overloading a single point of failure—namely, the customer IP interface that is accessible from the public Internet—attributable, for example, to a DDoS attack.

An exemplary apparatus for preventing data traffic overload of a customer enterprise network in a networked computing system, according to an aspect of the invention, includes a plurality of data centers, each of the data centers being in operative communication with one another via a secure connection. The data centers form at least one floating gateway for providing a distributed interface between a public network and an IP interface of the customer enterprise network, the IP interface of the customer enterprise network being inaccessible using a public IP address. The apparatus further includes at least one controller in operative communication with the data centers. The controller is configured to synchronize state information among the data centers and to control ingress and egress data traffic for each of the data centers.

In another aspect, an exemplary method for preventing data traffic overload of a customer enterprise network in a networked computing system includes: connecting a plurality of data centers such that each of the data centers is in operative communication with one another via a secure connection, the data centers being configured to form at least one floating gateway for providing a distributed interface between a public network and an IP interface of the customer enterprise network, the IP interface of the customer enterprise network being inaccessible using a public IP address; synchronizing state information among the data centers using at least one controller in operative communication with the data centers; and controlling ingress and egress data traffic for each of the data centers as a function of information received from the controller.

In yet another aspect, an exemplary non-transitory computer readable medium is provided including computer executable instructions which when executed by a computer cause the computer to perform a method of: connecting a plurality of data centers such that each of the data centers is in operative communication with one another via a secure connection; configuring the data centers to form at least one floating gateway for providing a distributed interface between a public network and an IP interface of a customer enterprise network, the IP interface of the customer enterprise network being inaccessible using a public IP address; synchronizing state information among the data centers; and controlling ingress and egress data traffic for each of the data centers as a function of information received from the data centers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Various units, circuits, modules, or other components may be described herein as being "configured to" perform a particular task or tasks. In such contexts, the term "configured to" is intended to be construed broadly as a recitation of structure generally meaning "having circuitry that" performs the task or tasks during operation. As such, the unit/circuit/module/component can be configured to perform the subject task or tasks even when the unit/circuit/module/component/is not currently powered on. In general, circuitry that forms the structure corresponding to "configured to" may include hardware circuits and/or memory storing program instructions executable to implement the operation. Similarly, various units/circuits/modules/components may be described as performing a task or tasks, for convenience in the description. Such descriptions should be interpreted as including the phrase "configured to." Reciting a unit/circuit/module/component that is configured to perform one or more tasks is expressly intended not to invoke a 35 U.S.C. § 112, paragraph (f) interpretation for that unit/circuit/module/component.

One or more embodiments of the invention, or elements and features thereof, can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an Internet Service Provider (ISP) peering router, data center, DDoS mitigation device, etc.) including memory and at least one processor that is coupled to the memory and operative to perform, or to facilitate the performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

reducing exposure of a customer enterprise network to the public Internet and associated attacks on customer network infrastructure and customer network services;
implementation of the novel data traffic overload mitigation techniques can be easily integrated with existing system hardware, thereby providing a more robust DDoS mitigation mechanism without significantly increasing system overhead and complexity;

providing substantial improvement in the service up-time by supporting rapid migration of the customer service gateway between a number of meshed data centers to address hardware and/or software outages in any of the data centers;

providing support for load balancing for at least some of the supported services, through supporting multiple service gateways for differentiated services for a given customer, where each gateway may be hosted on a different meshed data center, providing much more distributed customer service architecture and maximizing security footprint to mitigate exposure of any single point in the service network; and providing support for differentiated service paths, where ingress traffic may be coming into one of the meshed data centers and egress traffic may be leaving another meshed data center, providing path redundancy and further disrupting any network attack attempts on customer services.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
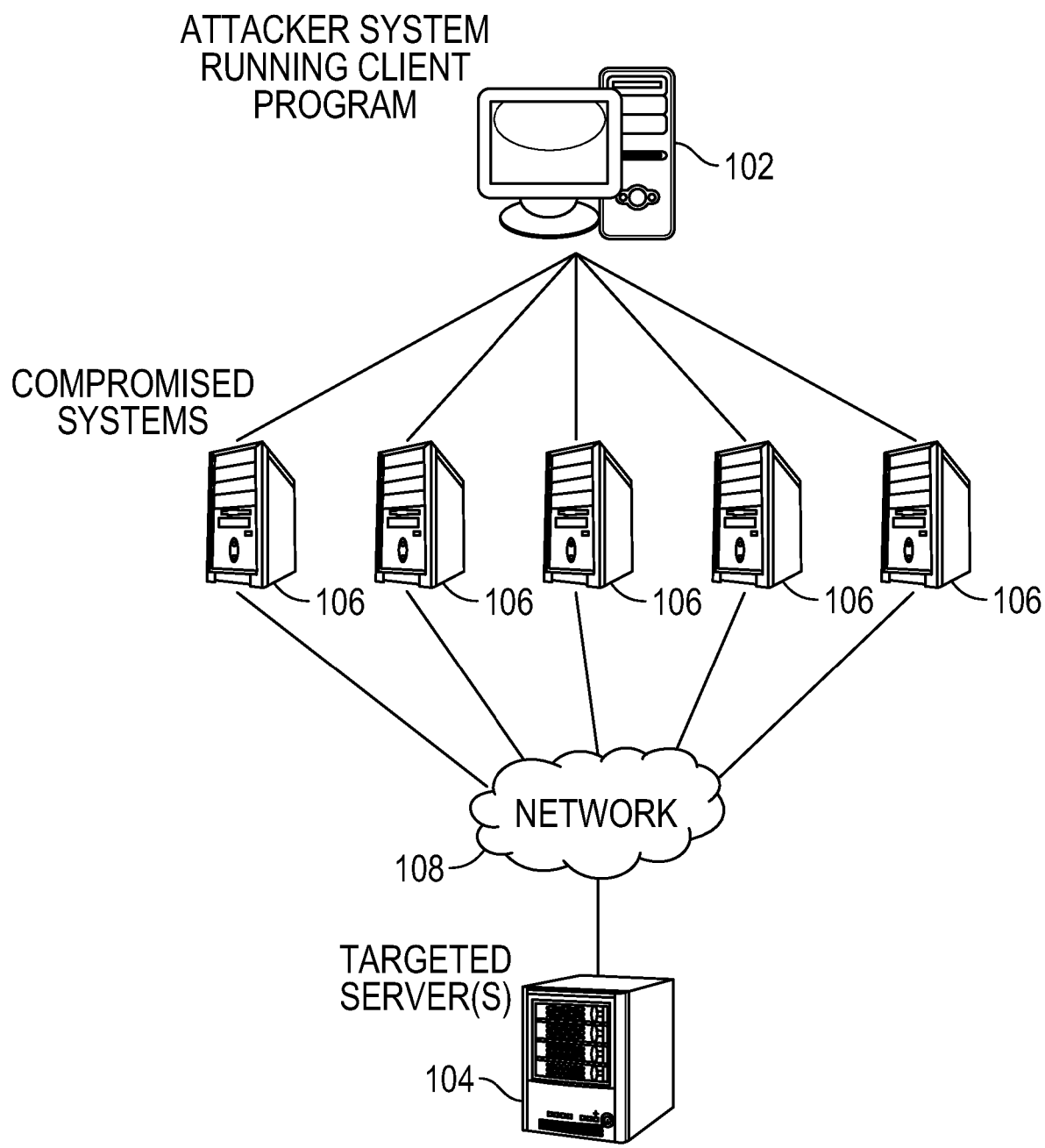
FIG. 1 is a block diagram conceptually depicting the occurrence of a distributed denial-of-service (DDoS) attack in an exemplary networked computing system.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present disclosure will be described herein in the context of a system, apparatus and methods for preventing distributed denial-of-service (DDoS) attacks in a networked computing environment. It should be understood, however, that embodiments of the invention are not limited to the system, methods and/or apparatus shown and described herein, nor are embodiments of the invention limited to a DDoS application. Rather, embodiments of the invention are more broadly applicable to techniques for preventing a customer network from being overloaded with data traffic by providing customers with at least one floating Internet Protocol (IP) gateway for their data (IP) services, with hosting implemented using a meshed or otherwise interconnected geographically distributed plurality of data centers. Multiple arrangements for individual floating gateways are contemplated by embodiments of the invention, ranging from a single floating gateway for all customer services, to a single floating gateway per customer service type, instantiated in a physically diverse data center. Moreover, it will become apparent to those skilled in the art given the teachings herein that numerous modifications can be made to the illustrative embodiments shown that are within the scope of the appended claims. That is, no limitations with respect to the embodiments shown and described herein are intended or should be inferred.

In the following description, certain specific details are set forth in order to provide a more thorough understanding of various aspects of the disclosed subject matter. However, it is to be appreciated that one or more embodiments of the disclosed subject matter may be practiced without all these specific details. In some instances, well-known apparatus and/or methods comprising embodiments of the subject matter disclosed herein have not been described in detail to avoid obscuring the descriptions of other aspects of the present disclosure.

Unless the context requires otherwise, throughout the specification and appended claims, the word "comprise" and variations thereof, such as "comprises" and "comprising," are to be construed in an open, inclusive sense; that is, as "including, but not limited to."

Reference throughout the specification to "one embodiment" or "an embodiment" is intended to imply that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Moreover, the particular features, structures, and/or characteristics may be combined in any suitable manner in one or more aspects of the present disclosure.

As previously stated, DDoS attacks are by definition distributed, and therefore it can be very difficult to accurately detect and mitigate attack traffic when the attacking source IP addresses are so widespread. Furthermore, a growing trend among DDoS attackers is to utilize sophisticated spoofing techniques and essential protocols to make DDoS attacks even more stealthy and disruptive. These attacks, which use legitimate application protocols and services, are very difficult to identify and defeat.

FIG. 1 is a block diagram conceptually depicting the occurrence of a DDoS attack in an exemplary networked computing system 100. In a typical DDoS attack, an attacker system 102 running a client program seeks to make a targeted system 104, often one or more Web servers, unavailable to its intended users. Denial of service is typically accomplished by the attacker system 102 flooding the targeted system 104 with superfluous requests or other malicious traffic via multiple compromised computer systems 106 connected with the targeted system in a distributed manner through a network 108, such as the Internet. The incoming traffic flooding the targeted system 104 in a DDoS attack originates from many different sources (e.g., compromised systems 106), thereby making it effectively impossible to stop the attack simply by blocking a single source.

The terms "network traffic," or "data traffic," or simply "traffic," as may be used interchangeably herein, are intended to broadly refer to the amount of data moving across a network at a given point in time. From a computing standpoint, network data in computer networks is most typically encapsulated in data packets, which provide the load in the network.

Figure 2:
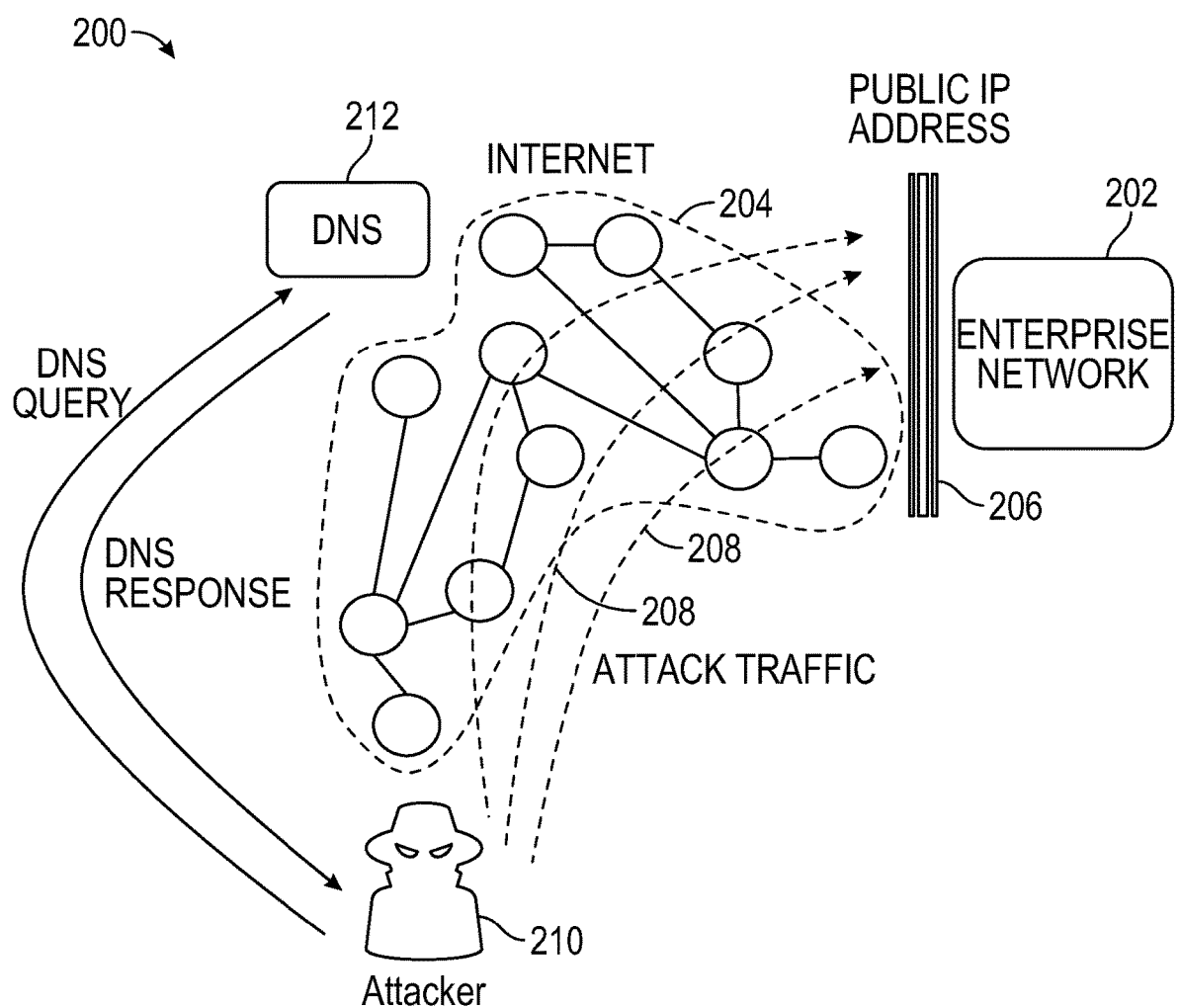
FIG. 2 is an illustrative computing system conceptually depicting a DDoS attack on a customer network.

FIG. 2 is an illustrative computing system 200 conceptually depicting a DDoS attack on a customer network. Customer networks, which may comprise various types of enterprise networks 202, are often connected to a public Internet 204 across an IP interface 206, such as, for example, Internet Protocol version 4 (IPv4) or Internet Protocol version 6 (IPv6), depending on customer needs and capabilities of their Internet service provider (ISP). This IP interface 206 is exposed to the whole public Internet 204, announced typically through IP block aggregation via the ISP, and accessible to various types of services in a bidirectional fashion. This means that hosts within the customer network are able to access resources across the public Internet (e.g., websites), while simultaneously any entity connected to the public Internet in any way is able to access the IP interface, using public IP addresses, at the edge of the customer network 202. Access to services and/or hosts within the customer network might be limited depending on the edge firewall policy and any ports exposed to the public Internet for access purposes.

A victim system (e.g., customer enterprise network 202) must be able to handle an influx of malicious traffic 208. Specifically, any malicious actor 210 having the ability to access the public IP interface 206 at the edge of the customer network is able to successfully execute any variety of DoS attacks, including a simple DoS attack (single attacking entity), DDoS attack (multiple attacking entities, typically in the form of compromised network hosts under the control of a centralized attacker) with potential attack traffic reflection, to hide the true source of the attack traffic 208, and amplification (to saturate access links to the customer network). The IP address associated with a given customer may be discovered through a simple lookup in a Domain Name System (DNS) 212, to request entries associated with a given registering entity, or may be known through other means. The DNS lookup shown in FIG. 2 is therefore optional.

Figure 3:
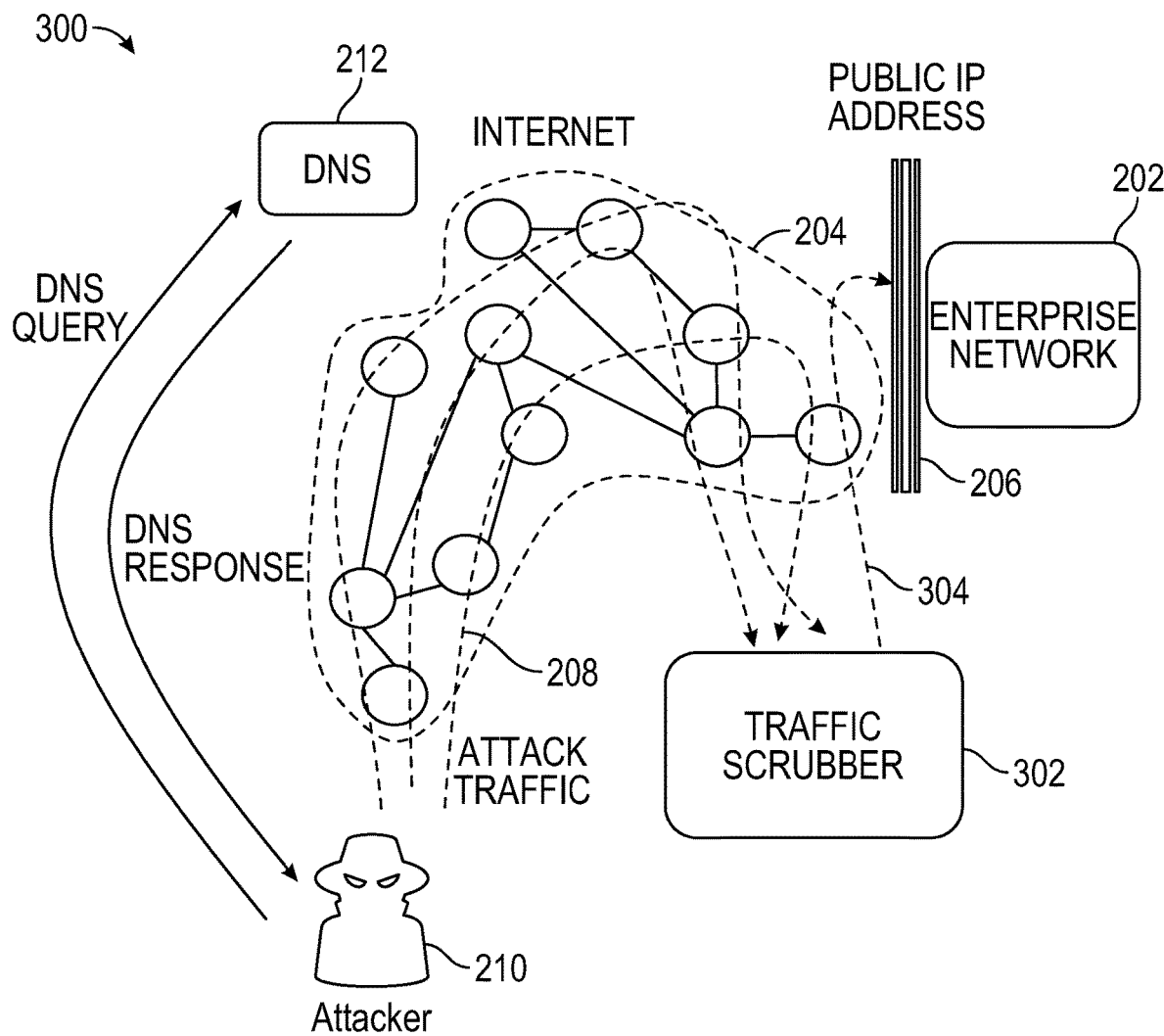
FIG. 3 is an illustrative computing system conceptually depicting an exemplary DDoS attack protection mechanism utilizing traffic scrubbing.

FIG. 3 is an illustrative networked computing system 300 conceptually depicting an exemplary DDoS attack protection mechanism which utilizes traffic scrubbing (i.e., filtering). In a networked computing environment, traffic scrubbing can be implemented using a scrubbing module. A scrubbing module is a data cleansing apparatus where incoming data traffic is analyzed and malicious traffic (e.g., Structured Query Language (SQL) injection, cross-site scripting (XSS), DDoS, etc.) is removed. Centralized scrubbing centers (including scrubbing modules) are often used by ISPs and cloud providers because of their ability to route potential malicious traffic to an out-of-path data cleansing station rather than keeping it in network and slowing down legitimate traffic. With an on-demand scrubbing center, when an attack is detected, the traffic is redirected (e.g., using DNS or Border Gateway Protocol (BGP)) to a local scrubbing center where the traffic is analyzed (e.g., using deep packet inspection (DPI)) and malicious traffic is filtered out while clean traffic passes back to the network for consumption.

More particularly, with reference to FIG. 3, the current generation of DDoS attack protection mechanisms are retroactive in that all network traffic reaching a target customer network 202 is first monitored by the ISP for specific attack signatures, using a variety of metrics, proprietary or otherwise, implemented by a given DDoS prevention platform, and the traffic (e.g., attack traffic 208) is redirected to a traffic scrubber 302 for scrubbing and active prevention only when an ongoing attack is detected. When the traffic scrubbing solution is engaged (on demand), traffic directed towards the customer network 202 is temporarily redirected and enters one of the scrubbing complexes (e.g., scrubber 302) of the ISP, where any data packets matching an attack signature are removed and any remaining (legitimate) traffic 304 is then forwarded towards the customer network 202 for proper consumption. Unfortunately, the retroactive mechanism has a number of disadvantages, including, but not limited to: a strong reliance on known attack signatures, thereby making detection and prevention of any new forms of volumetric network attacks difficult; retroactive character, requiring attack traffic to reach a prescribed threshold of volume and/or intensity to be properly detected and to trigger a decision regarding whether to engage a scrubbing center; and intermittent connectivity loss for the customer network, where the scrubbing process has the potential to cause connectivity interruptions due to data packet loss when the scrubbing complex is actively engaged in traffic filtering. Until a malicious traffic signature is detected in the customer traffic, the enterprise entity is still subject to a DoS attack. Furthermore, many times even when the traffic scrubbing mechanism is engaged, some of the legitimate traffic is lost.

Rather than engaging the traffic scrubbing mechanism reactively (i.e., on demand, only when a malicious traffic signature is detected), embodiments of the invention essentially take away the public IP address from the customer side altogether. In order to address the exposure of the public IP interface by hosting at the edge of the customer enterprise network 202, one or more embodiments of the invention advantageously delegate an IP address from a single location on the customer network interface facing the public Internet, essentially pushing the customer IP address into the cloud and providing customers with at least one floating IP gateway for their data (IP) services, with hosting implemented using meshed or otherwise interconnected geographically distributed data centers. As previously stated, multiple arrangements for individual floating gateways are possible, ranging from a single floating gateway for all customer services, to a single floating gateway per customer service type, instantiated in a physically diverse data center. In one or more embodiments employing multiple floating gateways, each of the floating gateways are preferably isolated from one another; that is, one floating gateway is inaccessible with respect to another floating gateway. In this manner, aspects of the present invention prevent or at least significantly reduce the likelihood of overload of a single point of failure—namely, the customer IP interface that is accessible from the public Internet—attributable, for example, to a DDoS attack.

In a typical denial-of-service attack of any kind, the attack is directed towards the IP address of a target customer exposed to the public Internet. In accordance with one or more embodiments of the invention, however, the customer IP address is hosted in a data center mesh. When an attack is detected, and at least one of the floating gateways needs to be moved to a geographically diverse data center, the service state between a target data center and a source data center is synchronized, whereby the floating gateway in the target data center takes on all traffic forwarding responsibilities from the floating gateway in the source data center, including service state, configuration, learned media access control (MAC) and IP addresses, etc. The attacker will attempt to follow the traffic, but given that the data centers can be geographically distinct, customer traffic can be moved across geographical locations. Denial of service attacks are typically focused on one geographical area; it is far more complex and challenging to attack a geographically distributed infrastructure.

One or more embodiments of the invention also beneficially provide separation of both directions of the data traffic, so that ingress traffic (i.e., data traffic towards the customer network) from the public Internet can be accepted in a first data center (or a first subset of data centers) in one geographical location, and egress traffic (i.e., data traffic from the customer network) to the public Internet can be sourced from a second data center (or a second subset of data centers) in another geographical location. Exemplary protocols suitable for implementing this novel approach include, but are not limited to, Datagram Delivery Protocol (DDP) or the like, to distinguish the multiple traffic routes, as will be known by those skilled in the art.

Aspects of the invention have widespread applicability beyond merely preventing DDoS attacks. In one or more embodiments, this novel approach of hosting a floating customer IP address using a mesh of interconnected, geographically distinct data centers can be extended to essentially any application in which it is desirable to prevent data traffic overload of a node in a networked computing system, such as, but not limited to, load balancing customer services across different data centers; based on a mesh of data centers and an overlaying architecture for utilizing the mesh, one can select which services are routed to a given public interface. Embodiments of the invention are also well-suited for data back-up applications, where, for example, a primary hand-off interface is located in one geographical location but when a performance degradation or outage is detected, hand-off can be immediately moved to a different location until the primary hand-off interface has recovered.

Figure 4:
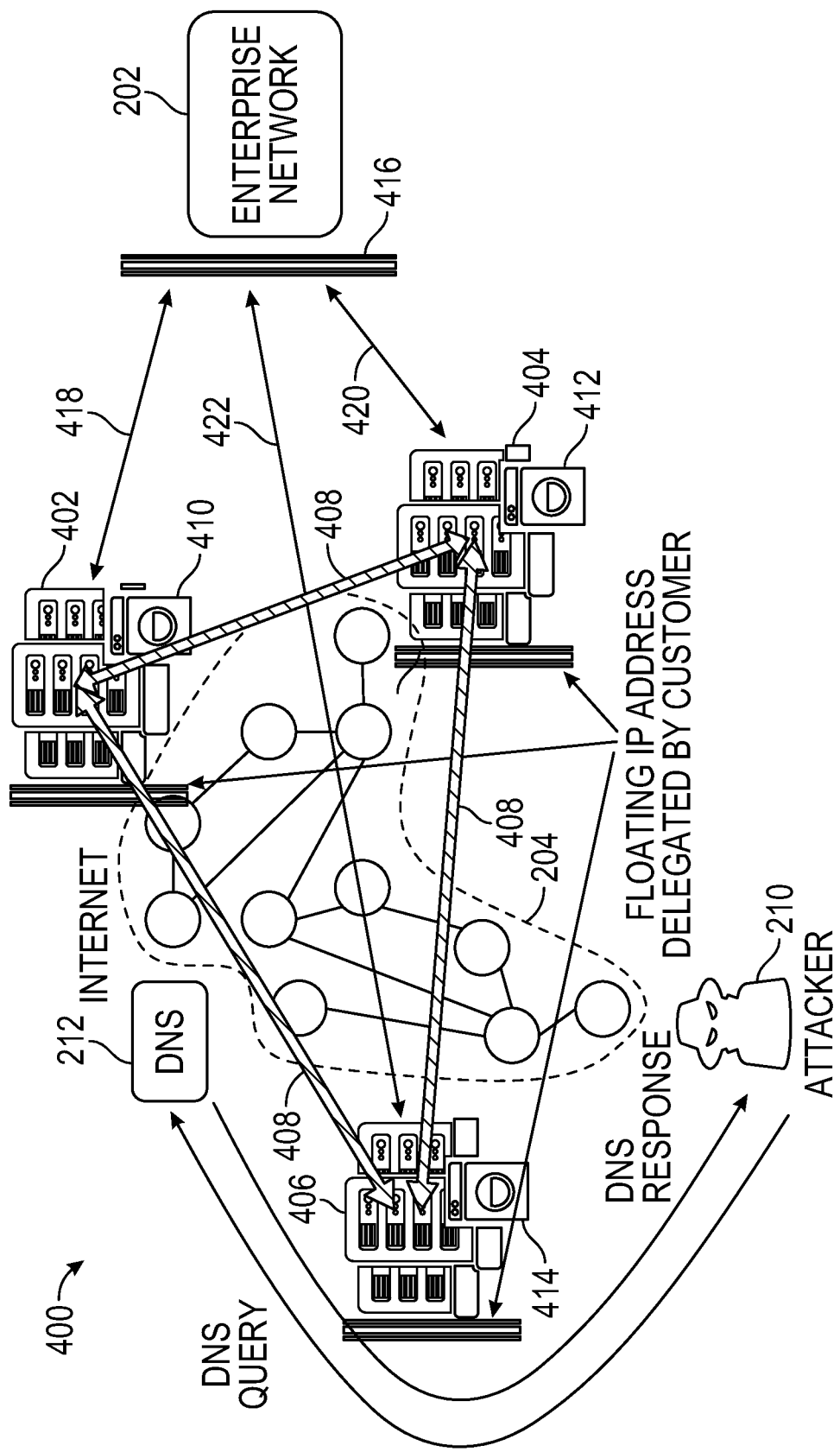
FIG. 4 is a block diagram conceptually depicting an exemplary networked computing system for preventing DDoS attacks, according to an embodiment of the invention.

FIG. 4 conceptually depicts a networked computing system 400 for preventing DDoS attacks, according to an embodiment of the invention. With reference now to FIG. 4, the networked computing system 400 includes a first data center 402, a second data center 404 and a third data center 406. Although three data centers are shown for economy of description, it is to be understood that embodiments of the invention are not limited to any particular number of data centers; that is, the number of data centers used in the system 400 may be more or less than three. Furthermore, the data centers 402, 404, 406 may reside in geographically different locations. By way of example only and without limitation, the first data center 402 may reside in North America, the second data center 404 may reside in Europe, and the third data center 406 may reside in Asia, although embodiments of the invention are not limited to any specific location of a given data center.

In one or more embodiments, all data centers 402, 404, 406 providing an IP delegation service to a target customer 202 are interconnected using essentially any secure connection 408 of choice. The secure connections 408 between the data centers 402, 404, 406 may be either wired or wireless, and may utilize standard-defined or proprietary communications protocols, including, for example, Ethernet virtual private network (EVPN) or virtual private LAN service (VPLS) transport tunnels with site-to-site Internet Protocol Security (IPSEC) or Transport Layer Security (TLS)/Secure Sockets Layer (SSL)-based virtual private network (VPN) service tunnels running on top. The secure connections 408 provide the ability for the data centers 402, 404, 406 to maintain state information, synchronize data and state changes, etc., presenting a single logical entity to a public network 204, such as the Internet.

In one or more embodiments, each of the data centers 402, 404 and 406 may include an integrated (i.e., built-in) scrubber module 410, 412 and 414, respectively, for providing data/traffic scrubbing functionality. The traffic scrubber functionality may be provided independently from the data center infrastructure, in one or more embodiments, and may be offered to the end customer as an add-on service, activated on demand. In alternative embodiments, the scrubbing functionality may reside externally with respect to a given data center(s), where the target traffic between the data center and the scrubbing center is exchanged using standard-defined or proprietary communications protocols, including, for example, EVPN or VPLS transport tunnels with site-to-site IPSEC or TLS/SSL-based VPN service tunnels running on top.

The customer enterprise network 202, in one or more embodiments, includes an interface 416 which is not accessible using a public IP address. Rather, the data centers 402, 404, 406 may communicate with the enterprise network 202 using a variety of options, depending on the geographical location of the customer network and available ISP options, among other factors. In one or more embodiments, each of the data centers 402, 404, 406 communicates with the enterprise network 202 via a dedicated communication channel 418, 420 and 422, respectively, such as, for example, a Layer 2 (L2) trunk, a combination of Multiprotocol Label Switching (MPLS)/Ethernet virtual private network (EVPN)/virtual private network (VPN) technologies, etc., using a provider assigned IP address.

Each of the data centers 402, 404, 406 includes a public Internet (or other network) facing IP interface. In the case of IP-based access technologies, the public Internet facing interface is assigned an IP address delegated by the data center service provider (e.g., a floating IP address) to prevent direct association between the customer network 202 and a public IP address register (e.g., DNS 212 shown in FIG. 4). In this manner, the customer enterprise network 202 essentially becomes part of a local area network (LAN) built across a distributed data center infrastructure (e.g., comprising data centers 402, 404, 406, and corresponding interconnections 408), thereby expanding the public facing interface of the customer network to a regional or even global footprint.

By increasing an effective size of the public Internet facing IP interface of the customer network 202, any type of DoS attack now must focus not only on a single physical interface, but must target a geographically distributed infrastructure with much higher access capacity. Focusing a large volume of data traffic against a single access point in the global Internet is relatively simple; however, mounting the same intensity of an attack against a large number of data centers across a regional or even global footprint with multiple redundant ISP connections is technically challenging, and thereby reduces the likelihood of a successful DDoS attack on, as well as overloading of, a customer network.

The data center-based LAN architecture according to embodiments of the invention beneficially provides at least one floating gateway (e.g., comprising data centers 402, 404 and 406, secure connections 408 between the data centers, and communication channels 418, 420 and 422) for all customer traffic, using communication protocols such as, for example, Gateway Load Balancing Protocol (GLBP) or Virtual Router Redundancy Protocol (VRRP), though here implemented in a virtual data center environment rather than in physical routers located at the edge of the customer network. As an added benefit, the floating gateway provides connectivity redundancy, protecting against multiple failures within each of the data centers, as well as within any interconnecting links to the data center infrastructure and within it.

An attachment point between the floating gateway and the public Internet 204 can, in one or more embodiments, be modified on the fly due to the interconnected nature of the distributed data center infrastructure, depending on the network conditions. Examples of network conditions that might initiate a change in the attachment point for the floating gateway may include, for example, network congestion (avoiding heavily congested data center access links), attack conditions (detection of an active network attack ongoing against one or more data centers), load balancing needs (distributing load across multiple data centers), attack prevention measures (periodically moving attachment point to thwart any potential network attacks), or even using unidirectional transmission capabilities, i.e., sourcing traffic from one data center and sinking traffic into another data center. The use of existing public Internet routing protocols, specifically, Border Gateway Protocol (BGP) for example, allows for a variety of different traffic engineering methods to relocate the attachment point across the distributed data center infrastructure.

As previously stated, each of the data centers 402, 404 and 406 participating in the distributed service data center infrastructure according to embodiments of the invention may be optionally equipped with an inline data scrubbing center 410, 412 and 414, respectively, that is continuously engaged in performing analysis and scrubbing for all data traffic ingressing the data center infrastructure. In this way, existing DDoS prevention mechanisms and solutions may be easily integrated into this solution, providing state-of-the-art DDoS detection and prevention mechanisms, while concurrently providing the cost-effectiveness of sharing resources among a number of customers.

Embodiments of the invention contemplate various mechanisms and actions for mitigating DDoS attacks. For example, in one or more embodiments, the DDoS attack mitigation actions performed may involve diverting traffic originating from a high-risk IP source to a DDoS mitigation device, such as a mitigation unit residing in one or more data centers 402, 404, 406, or an external mitigation unit, such as a module or controller residing in a corresponding router, which may be integrated in the public IP interface (e.g., IP interface 206 shown in FIG. 2). The DDoS mitigation device may be implemented in whole or in part in hardware, or as an application or module running on the hardware in the networked computing system. DDoS attack mitigation actions which may be performed by the mitigation device may include, but are not limited to, rate-limiting the traffic, discarding packets from the traffic, either randomly or in some defined manner, proxying the connection from the sender to the victim, presenting a challenge to the sender, and/or performing deep packet inspection (DPI) on all or a subset of the packets constituting the malicious traffic flow, as will become apparent to those skilled in the art given the teachings herein. In a challenge-based mechanism (e.g., challenge-response authentication), the DDoS mitigation device, in one or more embodiments, automatically sends a challenge, such as, for example, some JavaScript, to the (alleged) sender/client of the incoming traffic identified as suspicious. If the client is a valid browser, then it has no problem running the JavaScript and the mitigation device whitelists that client. Alternatively, if the client cannot run the JavaScript, it is assumed to be an attacker and is blacklisted.

Figure 5:
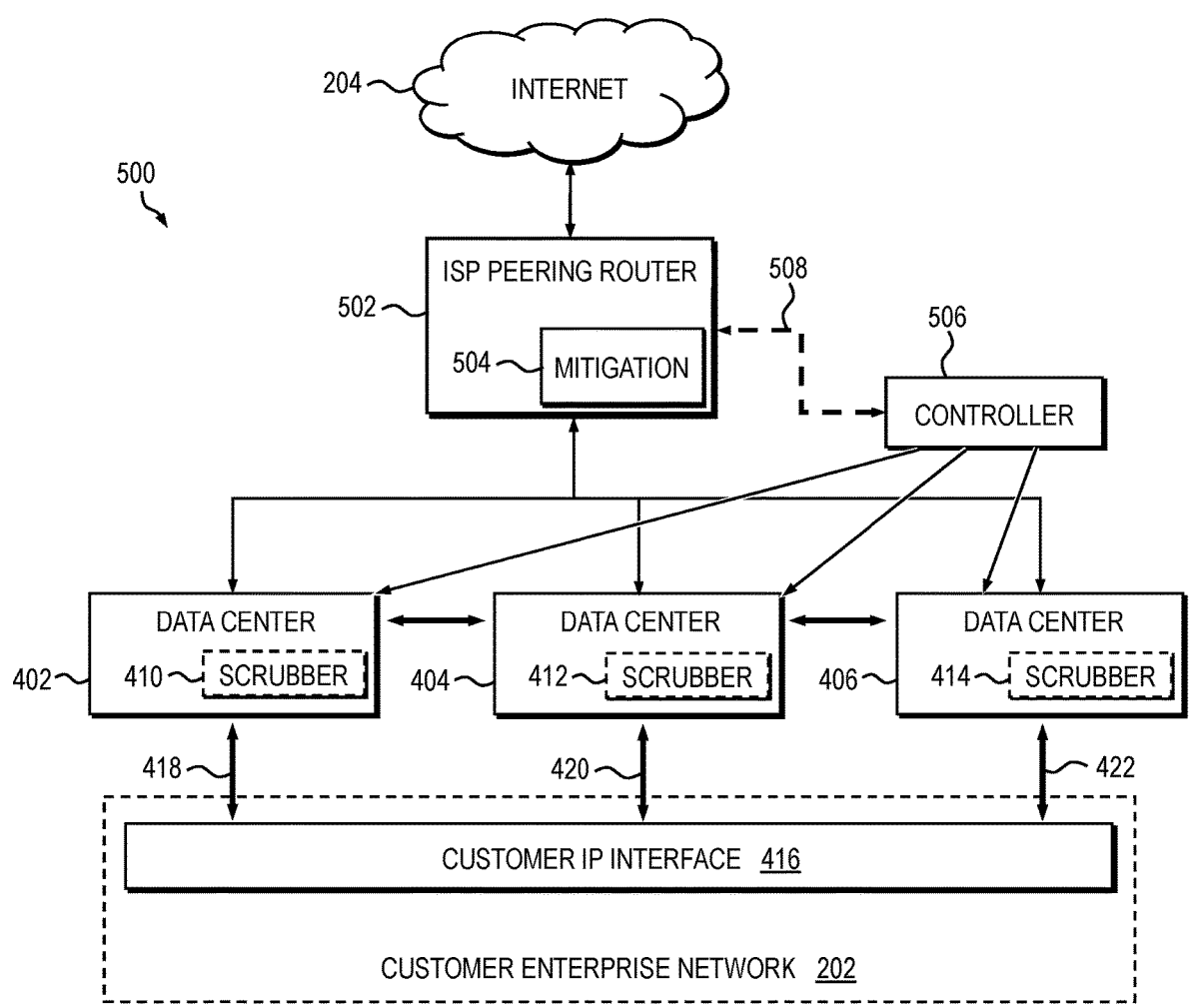
FIG. 5 is a block diagram depicting an exemplary networked computing system for preventing a customer enterprise network from being overloaded with data traffic, such as traffic attributable to a DDoS attack, according to an embodiment of the invention.

With reference now to FIG. 5, an exemplary networked computing system 500 is shown for preventing a customer enterprise network 202 from being overloaded with data traffic, such as traffic attributable to a DDoS attack, according to an embodiment of the invention. One or more aspects of the invention, according to illustrative embodiments thereof, limit exposure of the customer IP interface 416 by providing customers with a floating IP gateway for all of their data services and IP traffic, with hosting implemented using a mesh of distributed data centers 402, 404 and 406, as previously described. An ISP peering router 502 is provided in operative communication with the Internet 204 or other public network. The peering router 502 may, in one or more embodiments, include a mitigation module 504 configured to provide DDoS attack mitigation functionality consistent with at least one of the mitigation actions previously described.

The system 500 includes at least one controller 506 in operative communication with the data centers 402, 404, 406. The controller 506, in one or more embodiments, is configured to synchronize state information among the data centers 402, 404, 406, as well as to control ingress and egress data traffic for each of the data centers. The controller 506 may also perform various other functions, including, but not limited to, initiating traffic scrubbing actions, via one or more scrubbers 410, 412 and 414, residing in the respective data centers 402, 404 and 406. Consistent with the illustrative computing system 400 depicted in FIG. 4, the data centers 402, 404, 406 are coupled with an IP interface 416 of a customer enterprise network 202 using a dedicated communication channel which is not publicly accessible, such as, for example, an L2 trunk, a combination of MPLS/EVPN/VPN technologies, etc., as previously stated.

Optionally, in one or more embodiments, the controller 506 is operatively coupled with the router 502 via a connection 508 established between the controller and the router. In this arrangement, the controller 506 is preferably configured to obtain network traffic flow information from the router (e.g., using BGP or an alternative protocol) regarding current data traffic to the customer enterprise network 202, to monitor the current data traffic for attack signatures indicative of a DDoS attack, and to initiate the traffic scrubber (e.g., 410, 412, 414) in at least one of the data centers 402, 404, 406 to thereby remove the DDoS attack traffic from the current data traffic.

In one or more embodiments, the controller 506 is configured to modify an attachment point between the floating gateway (comprising the data centers 402, 404, 406 and corresponding interconnections) and the public Internet 204, due to the interconnected nature of the distributed data center infrastructure, as a function of one or more prescribed factor, such as, for example, network conditions. As previously explained, examples of network conditions that might initiate a change in the attachment point for the floating gateway may include, but are not limited to, network congestion, detection of an ongoing attack against one or more data centers, load balancing across multiple data centers, attack prevention measures (periodically moving the attachment point to thwart a potential network attack), or using unidirectional transmission capabilities.

Given the discussion thus far, it will be appreciated that, in general terms, an exemplary apparatus for preventing data traffic overload of a customer enterprise network in a networked computing system, in accordance with one or more embodiments, includes a plurality of data centers, each of the data centers being in operative communication with one another via a secure connection. The data centers form at least one floating gateway for providing a distributed interface between a public network and an IP interface of the customer enterprise network, the IP interface of the customer enterprise network being inaccessible using a public IP address. The apparatus further includes at least one controller in operative communication with the data centers. The controller is configured to synchronize state information among the data centers and to control ingress and egress data traffic for each of the data centers.

Given the discussion thus far, it will be appreciated that, in general terms, an exemplary method for preventing data traffic overload of a customer enterprise network in a networked computing system includes: connecting a plurality of data centers such that each of the data centers is in operative communication with one another via a secure connection, the data centers being configured to form at least one floating gateway for providing a distributed interface between a public network and an IP interface of the customer enterprise network, the IP interface of the customer enterprise network being inaccessible using a public IP address; synchronizing state information among the data centers using at least one controller in operative communication with the data centers; and controlling ingress and egress data traffic for each of the data centers as a function of information received from the controller.

Given the discussion thus far, it will be further appreciated that, in general terms, an exemplary non-transitory computer readable medium is provided including computer executable instructions which when executed by a computer cause the computer to perform a method of: connecting a plurality of data centers such that each of the data centers is in operative communication with one another via a secure connection; configuring the data centers to form at least one floating gateway for providing a distributed interface between a public network and an IP interface of a customer enterprise network, the IP interface of the customer enterprise network being inaccessible using a public IP address; synchronizing state information among the data centers; and controlling ingress and egress data traffic for each of the data centers as a function of information received from the data centers.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i)

specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 6:
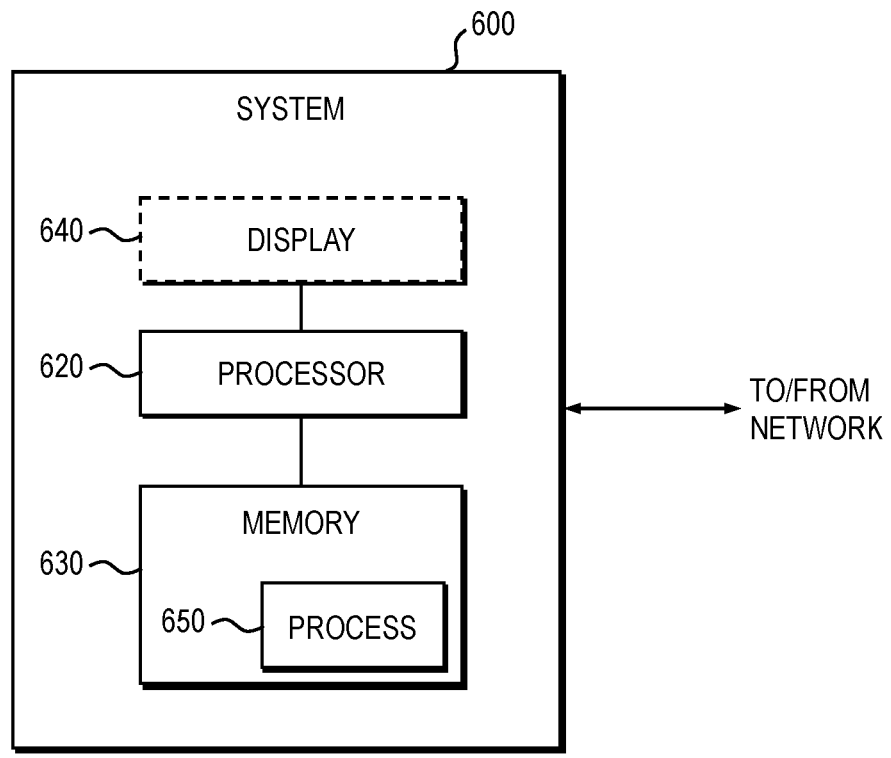
FIG. 6 is a block diagram of at least a portion of an exemplary system that can be configured to implement at least some aspects of the invention, according to one or more embodiments of the present invention.

FIG. 6 is a block diagram of at least a portion of an exemplary system 600 that can be configured to implement at least some aspects of the invention, and is representative, for example, of one or more of the apparatus or modules shown in the figures. As shown in FIG. 6, one or more programs or routines stored in memory 630 configures the processor 620 to implement one or more methods, steps, and functions (collectively, shown as process 650 in FIG. 6). The memory 630 could be distributed or local and the processor 620 could be distributed or singular. Different steps could be carried out by different processors, either concurrently (i.e., in parallel) or sequentially (i.e., in series).

The memory 630 could be implemented as an electrical, magnetic or optical memory, or any combination of these or other types of storage devices. It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware—an ASIC chip could be used to initiate a fusible link blowout. Display 640 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An apparatus for preventing data traffic overload of a customer enterprise network in a networked computing system, the apparatus comprising:
   a plurality of interconnected geographically distributed data centers, each of the data centers being in operative communication with one another via a secure connection, the data centers forming at least one floating gateway that provides a distributed interface between a public network and an Internet Protocol (IP) interface of the customer enterprise network, the distributed interface provided by the interconnected geographically distributed data centers being such that the floating gateway presents a single logical entity to the public network and such that the floating gateway prevents direct association between the customer enterprise network and the public network, the IP interface of the customer enterprise network being inaccessible from the public network using a public IP address absent intervention by the at least one floating gateway and being accessible via intervention by the at least one floating gateway; and at least one controller in operative communication with the interconnected geographically distributed data centers, the controller being configured to synchronize state information among the interconnected geographically distributed data centers and to control ingress and egress data traffic for each of the interconnected geographically distributed data centers;

further comprising an attachment point between the floating gateway and the public network that is configured to be dynamically modified depending on network conditions, wherein the floating gateway is transferred from residing in a source data center of the plurality of interconnected geographically distributed data centers to residing in a target data center of the plurality of interconnected geographically distributed data centers in response to detecting an attack.

2. The apparatus of claim 1, wherein each of at least a subset of the interconnected geographically distributed data centers comprises a traffic scrubber which, upon detection of an attack signature, is configured to remove malicious data traffic and to pass clean data traffic to the customer enterprise network.

3. The apparatus of claim 2, wherein the controller is in operative communication with a router coupled with the public network, the controller being configured: to obtain network traffic flow information from the router regarding current data traffic to the customer enterprise network; to monitor the current data traffic for attack signatures indicative of a distributed denial of service (DDoS) attack; and, when a DDoS attack signature is detected, to initiate the traffic scrubber in at least one of the data centers to thereby remove DDoS attack traffic from the current data traffic.

4. The apparatus of claim 1, wherein the controller is in operative communication with a router coupled with the public network, the controller being further configured: to obtain network traffic flow information from the router regarding current data traffic to the customer enterprise network; to monitor the current data traffic for data traffic overload conditions; and, when a data traffic overload condition is detected, to initiate one or more actions to mitigate the data traffic overload.

5. The apparatus of claim 1, wherein each of the interconnected geographically distributed data centers comprises a public network facing interface, the public network facing interface being assigned an IP address delegated by the customer enterprise network to thereby prevent direct association between the customer enterprise network and a public IP address register.

6. The apparatus of claim 1, wherein the secure connections interconnecting the interconnected geographically distributed data centers comprise at least one of a standard-defined communications protocol and a proprietary communications protocol.

7. The apparatus of claim 6, wherein the secure connections interconnecting the interconnected geographically distributed data centers comprise at least one of Ethernet virtual private network transport tunnels and virtual private local area network service transport tunnels with site-to-site Internet Protocol Security (IPSEC) or Transport Layer Security (TLS)/Secure Sockets Layer (SSL)-based virtual private network service tunnels running on top.

8. The apparatus of claim 1, wherein the interconnected geographically distributed data centers, in conjunction with the secure connections interconnecting the interconnected geographically distributed data centers, are configured to at least one of maintain state information relating to the customer enterprise network and synchronize data and state changes relating to the interconnected geographically distributed data centers.

9. The apparatus of claim 1, wherein the controller is configured to separate ingress traffic received from the public network from egress traffic sourced from the customer enterprise network.

10. The apparatus of claim 9, wherein the controller is configured: to accept ingress traffic in a first one of the interconnected geographically distributed data centers in a first geographical location; and to source egress traffic from a second one of the interconnected geographically distributed data centers in a second geographical location.

11. The apparatus of claim 1, wherein the controller is configured to monitor data traffic in each of the interconnected geographically distributed data centers and to perform load balancing of the data traffic among at least a subset of the interconnected geographically distributed data centers.

12. The apparatus of claim 1, wherein an IP address for accessing the customer enterprise network comprises at least one floating IP address delegated by the customer enterprise network.

13. The apparatus of claim 1, further comprising at least one data traffic scrubber in operative communication with the interconnected geographically distributed data centers and residing externally with respect to the interconnected geographically distributed data centers, wherein target data traffic between at least a given one of the interconnected geographically distributed data centers and the data traffic scrubber is exchanged using at least one of a standard-defined communications protocol and a proprietary communications protocol.

14. The apparatus of claim 13, wherein the communications protocol used to exchange the target data traffic between the given one of the interconnected geographically distributed data centers and the data traffic scrubber comprises at least one of Ethernet virtual private network transport tunnels and virtual private local area network service transport tunnels with site-to-site Internet Protocol Security (IPSEC) or Transport Layer Security (TLS)/Secure Sockets Layer (SSL)-based virtual private network service tunnels running on top.

15. A method for preventing data traffic overload of a customer enterprise network in a networked computing system, the method comprising:

connecting a plurality of interconnected geographically distributed data centers such that each of the interconnected geographically distributed data centers is in operative communication with one another via a secure connection, the interconnected geographically distributed data centers being configured to form at least one floating gateway that provides a distributed interface between a public network and an Internet Protocol (IP) interface of the customer enterprise network, the distributed interface provided by the interconnected geographically distributed data centers being such that the floating gateway presents a single logical entity to the public network and such that the floating gateway prevents direct association between the customer enterprise network and the public network, the IP interface of the customer enterprise network being inaccessible from the public network using a public IP address absent intervention by the at least one floating gateway and being accessible via intervention by the at least one floating gateway;

synchronizing state information among the interconnected geographically distributed data centers using at least one controller in operative communication with the interconnected geographically distributed data centers; and controlling ingress and egress data traffic for each of the interconnected geographically distributed data centers as a function of information received from the controller;

further comprising configuring an attachment point between the floating gateway and the public network to be dynamically modified depending on network conditions, and transferring the floating gateway from residing in a source data center of the plurality of interconnected geographically distributed data centers to residing in a target data center of the plurality of interconnected geographically distributed data centers in response to detecting an attack.

16. The method of claim 15, further comprising:
obtaining, from a router coupled with the public network, network traffic flow information regarding current data traffic to the customer enterprise network;
monitoring the current data traffic for data traffic overload conditions; and
when a data traffic overload condition is detected, initiating, by the controller, one or more actions to mitigate the data traffic overload.

17. The method of claim 15, further comprising performing traffic scrubbing upon detection of an attack signature associated with incoming data traffic to at least one of the interconnected geographically distributed data centers, wherein, upon detection of the attack signature, malicious data traffic is removed from the incoming data traffic and clean data traffic is passed to the customer enterprise network.

18. The method of claim 15, wherein each of the interconnected geographically distributed data centers comprises a public network facing interface, the method further comprising assigning an IP address delegated by the customer enterprise network to the public network facing interface to thereby prevent direct association between the customer enterprise network and a public IP address register.

19. The method of claim 15, further comprising separating ingress traffic received from the public network from egress traffic sourced from the customer enterprise network.

20. The method of claim 19, further comprising:
accepting ingress traffic in a first one of the interconnected geographically distributed data centers in a first geographical location; and
sourcing egress traffic from a second one of the interconnected geographically distributed data centers in a second geographical location.

21. The method of claim 15, further comprising:
monitoring, by the controller, data traffic in each of the interconnected geographically distributed data centers; and
performing load balancing of the data traffic among at least a subset of the interconnected geographically distributed data centers when the data traffic in a given one of the interconnected geographically distributed data centers exceeds a prescribed volume threshold.

22. A non-transitory computer readable medium comprising computer executable instructions which when executed by a computer cause the computer to perform a method of:
connecting a plurality of interconnected geographically distributed data centers such that each of the interconnected geographically distributed data centers is in operative communication with one another via a secure connection;
configuring the interconnected geographically distributed data centers to form at least one floating gateway that provides a distributed interface between a public network and an Internet Protocol (IP) interface of a customer enterprise network, the distributed interface provided by the interconnected geographically distributed data centers being such that the floating gateway presents a single logical entity to the public network and such that the floating gateway prevents direct association between the customer enterprise network and the public network, the IP interface of the customer enterprise network being inaccessible from the public network using a public IP address absent intervention by the at least one floating gateway and being accessible via intervention by the at least one floating gateway;
synchronizing state information among the interconnected geographically distributed data centers; and
controlling ingress and egress data traffic for each of the interconnected geographically distributed data centers as a function of information received from the interconnected geographically distributed data centers;
further comprising configuring an attachment point between the floating gateway and the public network to be dynamically modified depending on network conditions, and transferring the floating gateway from residing in a source data center of the plurality of interconnected geographically distributed data centers to residing in a target data center of the plurality of interconnected geographically distributed data centers in response to detecting an attack.

* * * * *